United States Patent Office 2,986,528
Patented May 30, 1961

2,986,528
METHOD OF OPTICALLY BRIGHTENING ORGANIC MATERIALS AND PREPARATIONS THEREFOR

Adolf Emil Siegrist, Basel, Max Duennenberger, Birsfelden, and Werner Grubenmann, Neuewelt, near Basel, Switzerland, assignors to Ciba Limited, Basel, Switzerland
No Drawing. Filed Mar. 7, 1957, Ser. No. 644,446
Claims priority, application Switzerland Mar. 16, 1956
20 Claims. (Cl. 252—301.2)

This invention is based on the observation that organic materials can be optically brightened in an advantageous manner by using an agent comprising an organic carrier material and fixed on the carrier material an optical brightening substance having at least one 5-membered heterocyclic ring.

The organic carrier material advantageously consists of one or more compounds of high molecular weight, for example, polymeric compounds, and advantageously compounds of this kind which can be formed into fibers. Especially advantageous carrier materials are polyesters, especially polyesters of terephthalic acid. Fibers made of such polyesters are known under the names "Terylene" and "Dacron," and the carrier material used in the present invention may be prepared, for example, from such fibers. A further valuable carrier material is polyacrylonitrile, which is known in the form of fibrous material under the names "PAN," "Orlon" and "Acrilan," and can be obtained, for example, from these fibrous materials for use in the present invention.

Further valuable carrier materials are polyamides, such as polyhexamethylene-adipic acid amide and the polymer of ε-caprolactam, which are known as fibrous materials under the names nylon and "Perlon." Acetyl-cellulose in the form of the diacetate or triacetate can also be used as carrier material.

It is usually necessary for the purposes of this invention that the carrier material should be in a finely divided form, so that the usual types of fibers, for example, continuous filaments or staple fibers, are not suitable as such in the present invention. Accordingly, it is necessary either to bring these materials into the desired state of fine subdivision during the manufacture of the polymers or by suitable treatment of the shaped polymeric material, for example, fibers. For this purpose, for example, the fibers may be dissolved in a suitable solvent, such as concentrated sulfuric acid or dimethyl-formamide, and the polymer reprecipitated from the solution. Furthermore, the starting material capable of being used to produce fibers, such as polyhexamethylene adipic acid amide chippings or acetyl-cellulose flocks, may be dissolved at a raised temperature and under pressure in a mixture of water and ethanol or in acetone or a mixture of methylene chloride and ethanol, and precipitated by cooling the solution or introducing it into water or ethanol. In the resulting state of fine subdivision the carrier material is suitable for treatment with the brightening substance by fixing the latter on the carrier material from an aqueous bath, the fixation being carried out by methods in themselves known, for example, the methods known for fixing optical brightening agents on textiles. An alternative procedure is to dissolve the optical brightening agent together with the fibrous material in a suitable solvent and reprecipitating the polymer containing the brightening agent from the solution.

It is usually of advantage to bring the carrier having the brightening agent fixed thereon into a state of finer subdivision than the normal powdered form. It may be of advantage to produce this finer state of subdivision only after the optical brightening agent has been fixed on the carrier, as in this maner the risk of growth in particle size of the carrier material during fixation of the brightener thereon is avoided. In some cases however, it may be possible to fix the optical brightening agent on the carrier material after it has been finely divided, without any substantial increase in particle size taking place. Subsequent conversion of the carrier into finely divided form is necessary, more especially, when the fixation has not been carried out on a finely divided carrier material, but, for example, by melting together the optical brightening agent and the carrier material or by fixing the brightening agent on the fibrous carrier material.

It may be said that in general for the purpose of optical brightening by the method of this invention the carrier having the brightening agent fixed thereon should advantageously be in a finely dispersed form, for example, such that the particle size is less than $50\mu$. However, a considerably smaller particle size, for example, of $1-5\mu$ or less, is especially advantageous.

The conversion of the carrier material into finely dispersed form before or, more especially, after fixation of the brightening agent on the carrier material may be carried out by methods in themselves known by means of apparatus of the kind customarily used, for example, by wet grinding in a so-called colloid mill. Dried powders or dispersions in water or organic solvents may be produced. In some cases the addition of a dispersing agent is desirable, especially for preparing fine aqueous dispersions. There are advantageously used non-ionic dispersing agents, for example, ethylene oxide condensation products of alkyl-phenols or alcohols of high molecular weight. Anion-active dispersing agents, such as dodecyl-benzene sulfonate or the reaction product of a mixture of naphthalene sulfonic acid with formaldehyde, known as sodium dinaphthyl-methane sulfonate, are also suitable for this purpose. In such dispersions the quantity of the optical brightening agent or water or of an organic solvent may vary within wide limits depending on the purpose for which the composition is to be used. The fine dispersions may, if desired, be subjected to spray drying without any harmful increase in particle size taking place.

Somewhat narrower, however, are the limits of the relative proportions of the carrier material and the brightening agent fixed thereon, because the brightening agent cannot be fixed on the carrier material in all proportions. The proportion of brightening agent that can be fixed on the carrier material is of the order of about 0.01 to 5%, and advantageously 0.05 to 2%, the actual proportion used varying considerably depending on the constitution of the carrier material and the brightening agent. As, however, the desired brightening effect can usually be obtained with quite small proportions of brightening agent, satisfactory to good brightening effects can be produced with combinations of carrier material and brightening agent in which the proportion of the latter fixed on the carrier material is relatively small.

It is of advantage to select a brightening agent which has a good fastness to light on the carrier material. As is known, the fastness to light does not depend exclusively on the constitution of the brightening agent, since the same brightener may exhibit quite different fastnesses to light on different substrata. In the present invention it is possible to incorporate a light-fast combination of optical brightening agent and carrier in a different substratum, on which the same optical brightening agent or another brightening agent and carrier in a different substratum, exhibits a low fastness to light. In this manner good to very good optical brightening effects that are fast to light can be produced on substrata for which no optical brightening agent fast to light has hitherto been found.

The optical brightening agents used in the present process contain at least one 5-membered heterocyclic ring, for example, an azole ring, such as an imidazole, oxazole, thiazole, 1:2:3-triazole or 1:3:4-oxdiazole ring. The optical bleaching agents may also contain combinations of these ring systems. Especially good results are obtained, for example, with dibenzimidazole derivatives free from groups imparting solubility in water and polyacrylonitrile, with quaternary oxa-cyanine derivatives and acetyl-cellulose or polyamides, with 1:3:4-oxdiazole derivatives containing groups imparting solubility in water and polyamides and especially with α:β-di-(benzoxazolyl)-ethylenes and polyesters of terephthalic acid.

By the present process it will be possible to produce useful preparations suitable for use in the optical brightening method of this invention. These preparations contain an organic carrier material in a fine state of division and an optical brightening agent fixed on the carrier material, and which latter is advantageously in a finely dispersed form.

As organic materials to be optically brightened by the method of this invention or with the aforesaid preparations there may be mentioned the following:

(a) Cellulosic materials, especially cellulose fibers suitable for the manufacture of non-textile products, and non-textile products composed of cellulose fibers such as paper pulp (for example, so-called hollander pulp), paper, cardboard or papier-mâché. The treatment may be carried out at different stages of manufacture, for example, before the paper or other product is formed or applied to the finished paper by dipping, brushing or calendering;

(b) Cellulose derivatives, such as viscose spinning solutions and acetyl-cellulose spinning solutions (including cellulose triacetate), to be used for the manufacture of shaped articles, such as spun goods or foils, and acetyl-cellulose or nitrocellulose to be used for making films;

(c) Compositions, such as polyamide melts or polyacrylonitrile spinning masses, suitable for the production of wholly synthetic fibers;

(d) Coating or dressing compositions for textiles, for example, those having a starch basis or casein basis, or having an artificial resin basis, for example, a vinyl acetate or derivatives of acrylic acid;

(e) Lacquers and films of various compositions, for example, those of vinyl acetate, alkyd resins or nitrocellulose;

(f) Artificial plastics, for example, epoxy resins, polyester resins, polyene resins such as polyvinyl chloride, or polyamide resins, polyurethane resins and aldehyde resins such as urea-formaldehyde or melamine-formaldehyde condensation products;

(g) Emulsions of artificial resins, for example, oil-in-water or water-in-oil emulsions;

(h) Intaglio printing inks, crayon compositions and cosmetic preparations.

It will be understood that the preparations of this invention may be combined with other agents for treating organic materials, or that the method of optical brightening of this invention may be combined with other treatments, for example, with chemical bleaching (provided that the optical brightening agent is not destroyed or substantially attacked thereby) or especially dyeing or pigmenting of the organic material with a white pigment, such as titanium dioxide, or with a colored pigment of inorganic or organic character, such as cadmium yellow or azo-pigments. The combined treatment is especially useful for the products mentioned under (g) (pigment printing) and (h).

The treatment of the organic materials to be brightened in accordance with this invention may be carried out by methods in themselves known. It is only necessary to take care to avoid the use of working conditions which would impair the optical brightening agent and/or the carrier material or which would impair the fine state of division of the carrier material.

The following examples illustrate the invention, the parts and percentages being by weight:

*Example 1*

100 parts of an ordinary commercial fibrous material of terephthalic acid polyglycol ester ("Dacron" or "Terylene") are dissolved in the cold in 400 parts of sulfuric acid of 96 percent strength. The solution is introduced into a mixture of ice and water, and the resulting fine precipitate is filtered off, washed with water until the filtrate is no longer acid to Congo paper, and dried.

100 parts of the powder so obtained are treated, while stirring, at 95–100° C. for ½ hour in a bath which contains in 3000 parts of water 1 part formic acid of 86 percent strength, and to which has previously been added a paste which contains 0.24 part of α:β-di-[5-methylbenzoxazolyl-(2)]-ethylene of the formula

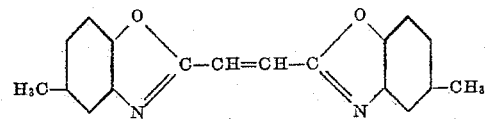

in a micro-dispersed form, and a non-ionic dispersing agent, for example, a condensation product of octadecyl alcohol with 30–40 mols of ethylene oxide. The mixture is then filtered hot, and the filter residue is washed with water and dried. No fluorescent substance is present in the filtrate so that the powder contains a total of 0.24% of brightening agent. It has a higher content of white than it had before the treatment with the optical bleaching agent.

15 parts of the powder so treated are ground for 48 hours with 7.5 parts of a condensation product of octadecyl alcohol and about 30–40 mols of ethylene oxide and 77.5 parts of water to form a finely dispersed paste of which the particle size is substantially 1–3μ. The preparation so obtained, which contains 0.036% of brightening agent in the finely dispersed paste, is a valuable optical brightening preparation.

A preparation having similar properties is obtained by first grinding terephthalic acid polyglycol ester to a finely dispersed paste and subsequently fixing the optical brightening agent therein.

*Example 2*

21 parts of the polyester powder brightened in the manner described in the first and second paragraphs of Example 1 are ground with 4.2 parts of nitrocellulose (containing about 35 percent of butanol) and 114.8 parts of n-butyl acetate for about 24 hours to form a finely dispersed paste of which the particle size is mainly 1–2μ. The preparation so obtained contains 0.24% of the brightening agent fixed on the finely dispersed polyester and is a valuable optical brightening preparation.

*Example 3*

50 parts of a terephthalic polyglycol ester are treated at 90–95° C., while stirring, for one hour in a bath which contains in 1500 parts of water 4 parts of sodium chlorite and 2 parts of formic acid of 86 percent strength, and at the same time a paste is added which contains 0.25 part of α:β-di-[benzoxazolyl-(2)]-ethylene of the formula in micro-dispersed form and also a non-ionic dispersing agent, for example, a condensation product of octadecyl alcohol and 30–40 mols of ethylene oxide. After the terephthalic acid polyglycol ester has been chemically bleached and optically brightened at the same time, it is filtered off while hot and the filter residue is washed with water and dried. The powder obtained in this manner, which contains 0.5% of brightening agent, has a considerably higher content of white than it had before treatment with the optical brightening agent, and than the same powder has when simply bleached with sodium chlorite.

21 parts of the powder so treated are ground with 14 parts of a condensation product of para-nonyl-phenol with 9 mols of ethylene oxide and 105 parts of water for 60 hours to form a finely dispersed paste of which the particle size is substantially 2–5μ. The preparation so obtained is a valuable optically brightening preparation.

By using in this example, instead of 14 parts of the non-ionic dispersing agent obtained from para-nonyl-phenol and 9 mols of ethylene oxide, 14 parts of so-called sodium dinaphthyl-methane sulfonate or 14 parts of dodecyl-benzene sulfonate, an optical brightening preparation having similar properties is obtained.

Example 4

100 parts of an ordinary commercial polyacrylonitrile powder are treated at 90–95° C. for one hour, while stirring, in a bath which contains in 3000 parts of water, 8 parts of sodium chlorite, 4 parts of oxalic acid and 15 parts of hydrogen peroxide of 27.9% strength. The whole is then cooled to 60° C., filtered while hot, and the filter residue is washed with hot water. The moist filter residue is then treated at 90–95° C. for 30 minutes, while stirring, in a bath which contains in 3000 parts of water 8 parts of sodium bisulfite, 3 parts of oxalic acid. The mixture is then cooled to about 60° C., filtered while hot, and washed with hot water and dried.

A homogeneous solution of 50 parts of the chemically bleached polyacrylonitrile powder, 0.5 part of 2:5-[benzimidazyl-(2)]-pyrrole of the formula

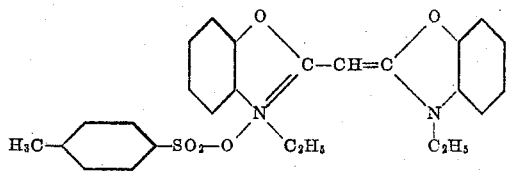

in 150 parts of dimethylformamide is prepared in a kneading apparatus capable of being heated. There are then added 150 parts of water, and the resulting granulate is placed in a suction filter and the dimethyl-formamide is completely removed by washing with water. After drying the product in a vacuum cabinet at 85° C., it is ground in a percussion mill. The polyacrylonitrile powder so obtained has a higher content of white than the polyacrylonitrile powder which has merely been chemically bleached and contains no optical brightening agent. It can be transformed into a finely dispersed paste together with a condensation product from para-nonyl-phenol and 9 mol of ethylene oxide in an aqueous medium. The so-obtained paste is a valuable preparation for the optical brightening.

Example 5

50 parts of a polyacrylonitrile powder are treated at 90–95° C. for one hour while stirring in a bath which contains in 1500 parts of water 4 parts of sodium chlorite, 2 parts of oxalic acid and 7.5 parts of hydrogen peroxide of 27.9% strength, and there is added at the same time a solution of 0.015 part of 2:5-di-[benzimidazyl-(2')]-ethylene of the formula

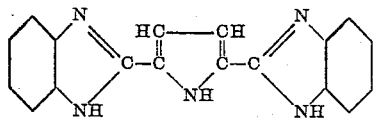

dissolved in 50 parts of ethanol with the aid of 0.2 part of sodium hydroxide solution of 30% strength. When the polyacrylonitrile powder has been simultaneously chemically bleached and optically brightened in this manner, it is filtered off while hot and the filter residue is washed with hot water.

30 parts of the moist filter residue, containing 14 parts of dry substance, are ground with 7 parts of a condensation product of octadecyl alcohol with about 30–40 mols of ethylene oxide and 103 parts of water for 60 hours to form a finely dispersed paste, of which the particle size is mainly 2–5μ. The preparation so obtained contains 0.03% of the brightening agent fixed on the finely dispersed polyacrylonitrile and is valuable optical brightening preparation.

The finely dispersed micro-paste so obtained can be sprayed in a spray drier to form a micro-powder.

Example 6

To a solution of 150 parts of acetyl-cellulose (di-acetate) in 850 parts of acetone there are added, while stirring, 3 parts of 3:3'-diethyl-oxacyanine para-toluene sulfonate of the formula

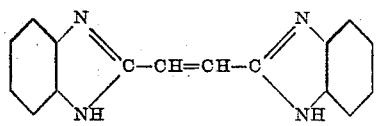

dissolved in 50 parts of ethanol. The temperature is adjusted to 30° C. and the mixture is stirred for a further 30–60 minutes at that temperature. The mixture is then introduced in a fine stream, while stirring vigorously, into a large amount of water, the finely divided fibrous material so obtained is filtered off and washed with water and dried. It is then ground first in a friction disc mill and then in a percussion mill having a sieve. The acetyl-cellulose powder so obtained has a considerably higher content of white than the same powder not containing the optical brightening agent.

8 parts of the treated powder are ground with 4 parts of a condensation product of para-nonyl-phenol with 9 mols of ethylene oxide and 88 parts of water for 36 hours to form a finely dispersed paste of which the particle size is substantially 1–5μ. The preparation so obtained, which contains 2% of brightening agent fixed on the finely dispersed acetyl-cellulose, is a valuable optical brightening preparation.

The preparation having similar properties is obtained by subjecting an optically brightened acetyl-cellulose solution to spray drying.

Example 7

75 parts of polyhexamethylene-adipic acid amide chippings (nylon) are dissolved in 210 parts of water and 210 parts by volume of methanol at 165–170° C. in an autoclave with the exclusion of air, as described in U.S. Patent No. 2,742,440, and the fine powder obtained after cooling is filtered off, washed with water and dried at 50–60° C. under reduced pressure.

50 parts of this powder are treated at 90–95° C. for one hour in a bath which contains in 1500 parts of water 2 parts of sodium chlorite and 0.5 part of acetic acid. The mixture is then cooled to about 60° C., filtered while hot and washed with hot water. The moist filter residue is then treated, while stirring, in a bath which contains 2 parts of formic acid of 86 percent strength and 1 part of 2:5-bis-(sulfo-styryl)-1:3:4-oxdiazole of the formula

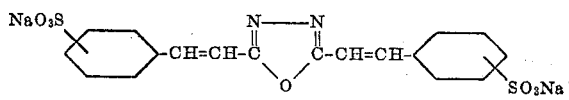

the temperature being raised from 60° C. to 80° C. in the course of 45 minutes. After cooling the mixture to room temperature it is filtered and the filter residue is washed with water and dried. It has a higher content of white that before it was treated with the optical brightening agent.

14 parts of the powder so treated are ground with 7 parts of a condensation product of para-nonyl-phenol with 9 mols of ethylene oxide and 119 parts of water for 42 hours to form a finely dispersed paste of which the particle size is substantially 1–2μ and less. The preparation so obtained, which contains about 2% of brightening agent fixed on the finely dispersed nylon, is a valuable brightening preparation.

A preparation having similar properties is obtained by using 75 parts of polymeric ε-caprolactam ("Perlon") instead of 75 parts of polyhexamethylene-adipic acid amide.

By using, instead of formic acid and 2:5-bis(sulfostyryl)-1:3:4-oxdiazole, 3 parts by volume of an aqueous ammonia solution of 20 percent strength and 2 parts of 3:3'-diethyl-oxacyanine para-toluene sulfonate, there is obtained a preparation having similar properties.

*Example 8*

4.5–5% of the preparation obtained as described in Example 1 or 3 is stirred into a viscous spinning mass containing 8.5% of α-cellulose. By spinning, desulfuring, scrooping and drying there is obtained a viscose artificial silk having a higher content of white of good fastness to light than the silk produced in the same manner, but without the addition of the optical brightening preparation. The optically brightened viscose artificial silk contains 0.0015–0.003% of the optical brightening agent.

*Example 9*

100 parts of chemically bleached sulfite cellulose are ground in a hollander. There are added to the resulting mass 10–20 parts of the preparation obtained as described in Example 1, 3 or 7, 2 parts of resin size and 4 parts of aluminum sulfate. After grinding the mixture for a further 15 minutes, the mass so obtained is passed by way of the mixing vat to a paper machine. The paper produced in this manner has a higher content of white than the paper produced in the same manner, but without the addition of the optical brightening agent. The brightened paper contains about 0.003 to 0.02% of the optical brightening agent.

*Example 10*

A paper web produced from chemically bleached sulfite cellulose and containing 2% of resin size and 3% of aluminum sulfate is treated on the size press with a suspension of 6 parts of an ordinary commercial starch product in 94 parts of water and 20–40 parts of the preparation obtained as described in Example 1, 5 or 6. The paper so treated has a higher content of white than the untreated paper.

*Example 11*

1000 parts of a nitrocellulose lacquer of the usual composition (advantageously one containing, in addition to nitrocellulose, an alkyl resin, a carbamide resin and, if desired, a plasticiser such as dioctyl phthalate) are stirred with 60 parts of the preparation obtained as described in Example 2, and the composition is coated on to paper by means of a film coating device. After being dried, the coated paper has a greater whiteness than paper treated in the same manner but without the addition of the optical brightening preparation.

*Example 12*

A paste is prepared by melting at 80° C. 20 parts of the condensation product of 2 mols of stearic acid with 1 mol of diethylene triamine, and, while stirring, there are slowly introduced dropwise, first, 4 parts of glacial acetic acid and then 76 parts of hot water.

Unbleached viscose crepe is treated on the foulard with a dressing liquor which contains, per liter of water, 3 grams of the above paste and 20 to 30 grams of the preparation obtained as described in Example 4 or 6. After being squeezed and dried, the dressed viscose crepe possesses a soft feel and a whiter appearance than a viscose crepe which has been dressed with the same composition but without the addition of the brightening preparation.

*Example 13*

Undyed cotton cloth is treated on a foulard with a dressing liquor which contains, per liter of water, 100 grams of an ordinary commercial starch product and 50 grams of the finely dispersed optical brightening preparation obtained as described in Example 6 or 7. After being squeezed and dried the dressed cotton cloth, in addition to having a dressing with a full or good feel, has a whiter appearance than the cotton cloth dressed only with the starch product.

What is claimed is:

1. A process for the optical brightening of cellulosic material which comprises applying to said material a composition substantially consisting of an organic carrier material having a particle size less than 50μ, being capable of forming fibers and being selected from the group consisting of polyacrylonitrile, polyester, polyamide and acetyl cellulose, on which organic carrier is fixed an optical brightening agent having at least one five-membered heterocyclic ring selected from the group consisting of imidazole, oxazole, 1:2:3-triazole and 1:3:4-oxdiazole rings.

2. A process for the optical brightening of cellulosic material which comprises applying to said material a composition substantially consisting of an organic carrier material having a particle size of about 1–5μ, being capable of forming fibers and being selected from the group consisting of polyacrylonitrile, polyester, polyamide and acetyl cellulose, on which organic carrier is fixed an optical brightening agent having at least one five-membered heterocyclic ring selected from the group consisting of imidazole, oxazole, 1:2:3-triazole and 1:3:4-oxdiazole rings.

3. A process for the optical brightening of cellulosic material which comprises applying to said material a composition substantially consisting of an organic carrier material having a particle size of about 1–5μ, being capable of forming fibers and being selected from the group consisting of polyacrylonitrile, polyester, polyamide and acetyl cellulose, on which organic carrier there has been fixed in an aqueous bath an optical brightening agent having at least one five-membered heterocyclic ring selected from the group consisting of imidazole, oxazole, 1:2:3-triazole and 1:3:4-oxdiazole rings.

4. A process for the optical brightening of cellulosic material which comprises applying to said material a composition substantially consisting of terephthalic acid polyglycol ester having a particle size of about 1–5μ on which there has been fixed in an aqueous bath an $\alpha:\beta$-di-[benzoxazolyl-(2)]-ethylene.

5. A process for the optical brightening of cellulosic material which comprises applying to said material a composition substantially consisting of polyacrylonitrile having a particle size of about 1–5μ on which there has been fixed in an aqueous bath a dibenzimidazole derivative.

6. A process for the optical brightening of cellulosic material which comprises applying to said material a composition substantially consisting of acetyl cellulose having a particle size of about 1–5μ on which there has been fixed a quaternary oxacyanine derivative.

7. A process for the optical brightening of cellulosic material which comprises applying to said material a composition substantially consisting of polyamide having a particle size of about 1–5μ on which there has been fixed in an aqueous bath a quaternary oxacyanine derivative.

8. A process for the optical brightening of cellulosic material which comprises applying to said material a composition substantially consisting of polyamide having a particle size of about 1–5μ on which there has been fixed in an aqueous bath a 1:3:4-oxdiazole compound containing a group imparting solubility in water.

9. A process for the optical brightening of cellulosic material which comprises applying to said material a composition substantially consisting of terephthalic acid polyglycol ester having a particle size of about 1–5µ on which there has been fixed in an aqueous bath the α:β-di-[benzoxazolyl-(2)]-ethylene of the formula

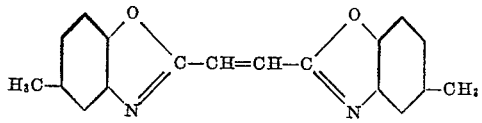

10. A process for the optical brightening of cellulosic material which comprises applying to said material a composition substantially consisting of polyacrylonitrile having a particle size of about 1–5µ on which there has been fixed in an aqueous bath the dibenzimidazole derivative of the formula

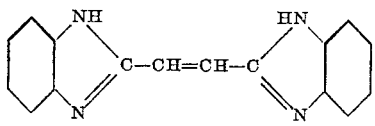

11. A process for the optical brightening of cellulosic material which comprises applying to said material a composition substantially consisting of cellulose diacetate having a particle size of abou 1–5µ on which there has been fixed the quaternary oxacyanine derivative of the formula

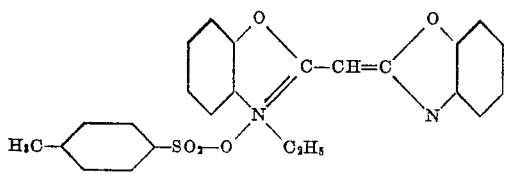

12. A process for the optical brightening of cellulosic material which comprises applying to said material a composition substantially consisting of polyhexamethyleneadipic acid amide having a particle size of about 1–5µ on which there has been fixed in an aqueous bath the quaternary oxacyanine derivative of the formula

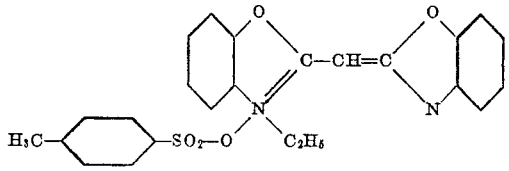

13. A process for the optical brightening of cellulosic material which comprises applying to said material a composition substantially consisting of a polyhexamethyleneadipic acid amide having a particle size of about 1–5µ on which there has been fixed in an aqueous bath the 1:3:4-oxdiazole compound of the formula

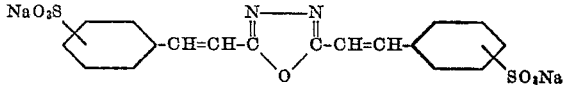

14. An optical brightening composition substantially consisting of an organic carrier material having a particle size less than 50µ, being capable of forming fibers and being selected from the group consisting of polyacrylonitrile, polyester, polyamide and acetyl cellulose, on which organic carrier is fixed an optical brightening agent having at least one five-membered heterocyclic ring selected from the group consisting of imidazole, oxazole, 1:2:3-triazole and 1:3:4-oxdiazole rings.

15. An optical brightening composition substantially consisting of an organic carrier material having a particle size of about 1–5µ, being capable of forming fibers and being selected from the group consisting of polyacrylonitrile, polyester, polyamide and acetyl cellulose, on which organic carrier is fixed an optical brightening agent having at least one five-membered heterocyclic ring selected from the group consisting of imidazole, oxazole, 1:2:3-triazole and 1:3:4-oxdiazole rings.

16. An optical brightening composition substantially consisting of terephthalic acid polyglycol ester having a particle size of about 1–5µ on which there has been fixed in an aqueous bath an α:β-di-[benzoxazolyl-(2)]-ethylene.

17. An optical brightening composition substantially consisting of polyacrylonitrile having a particle size of about 1–5µ on which there has been fixed in an aqueous bath a dibenzimidazole derivative.

18. An optical brightening composition substantially consisting of acetyl cellulose having a particle size of about 1–5µ on which there has been fixed a quaternary oxacyanine derivative.

19. An optical brightening composition substantially consisting of polyamide having a particle size of about 1–5µ on which there has been fixed in an aqueous bath a quaternary oxacyanine derivative.

20. An optical brightening composition substantially consisting of polyamide having a particle size of about 1–5µ on which there has been fixed in an aqueous bath a 1:3:4-oxdiazole compound containing a group imparting solubility in water.

References Cited in the file of this patent

UNITED STATES PATENTS

| | | |
|---|---|---|
| 2,515,173 | Ackermann | July 18, 1950 |
| 2,620,282 | Fry | Dec. 2, 1952 |
| 2,765,239 | Siegrist | Oct. 2, 1956 |
| 2,795,590 | Siegrist | June 11, 1957 |

FOREIGN PATENTS

| | | |
|---|---|---|
| 718,119 | Great Britain | Nov. 10, 1954 |

OTHER REFERENCES

Sanders: Abstract of application Serial No. 791,145, pub. April 21, 1953, in 669 O.G. 920–921.

UNITED STATES PATENT OFFICE
CERTIFICATION OF CORRECTION

Patent No. 2,986,528                                May 30, 1961

Adolf Emil Siegrist et al.

It is hereby certified that error appears in the above numbered patent requiring correction and that the said Letters Patent should read as corrected below.

Column 6, line 70, for "that" read -- than --; column 9, lines 28 to 32 and lines 42 to 46, the right-hand portion of the formulas, each occurrence, should appear as shown below instead of as in the patent:

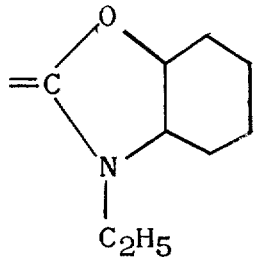

Signed and sealed this 5th day of December 1961.

(SEAL)
Attest:

ERNEST W. SWIDER
Attesting Officer

DAVID L. LADD
Commissioner of Patents